(12) United States Patent
Betley et al.

(10) Patent No.: US 7,044,171 B2
(45) Date of Patent: May 16, 2006

(54) EXTERIOR DUCTWORK SYSTEM

(75) Inventors: James W. Betley, 15 Valerie Dr., Bear, DE (US) 19701; Keith S. Betley, Bear, DE (US); Dennis L. Horn, Wilmington, DE (US); Ralph Raymond Delaney, Wilmington, DE (US); Richard S. Robertson, Talleyville, DE (US); Larry C. Johnson, Bear, DE (US); Daniel Lee Hightman, Smyrna, DE (US)

(73) Assignee: James W. Betley, New Castle, DE (US)

( * ) Notice: Subject to any disclaimer, the term of this patent is extended or adjusted under 35 U.S.C. 154(b) by 69 days.

(21) Appl. No.: 10/781,611

(22) Filed: Feb. 18, 2004

(65) Prior Publication Data

US 2005/0000585 A1    Jan. 6, 2005

Related U.S. Application Data

(60) Provisional application No. 60/473,903, filed on May 28, 2003.

(51) Int. Cl.
*F16L 9/00*    (2006.01)

(52) U.S. Cl. ............ 138/178; 138/DIG. 4; 138/DIG. 11

(58) Field of Classification Search ................ 138/149, 138/177, 178, DIG. 4, DIG. 11
See application file for complete search history.

(56) References Cited

U.S. PATENT DOCUMENTS

| | | | | |
|---|---|---|---|---|
| 2,842,222 A | * | 7/1958 | Hughett | 52/144 |
| 2,916,054 A | | 12/1959 | Callan | |
| 2,946,510 A | * | 7/1960 | Galvin | 237/70 |
| 3,227,063 A | * | 1/1966 | Lambert | 454/299 |
| 3,474,720 A | * | 10/1969 | Qualley et al. | 454/236 |
| 3,543,804 A | * | 12/1970 | Ziegler | 138/105 |
| 3,761,600 A | * | 9/1973 | Perry | 174/16.2 |
| 4,184,538 A | * | 1/1980 | Rauenhorst | 165/66 |
| 4,265,300 A | * | 5/1981 | Kurimoto | 165/47 |
| 4,334,577 A | * | 6/1982 | George | 165/54 |
| 4,735,235 A | | 4/1988 | Anderson et al. | |
| 5,353,564 A | * | 10/1994 | Hansen | 52/407.1 |
| 5,460,206 A | * | 10/1995 | Sansoucy | 138/149 |
| 5,918,644 A | * | 7/1999 | Haack et al. | 138/151 |
| 6,161,593 A | * | 12/2000 | Lardillat et al. | 138/149 |
| 6,311,735 B1 | | 11/2001 | Small, Sr. | |
| 6,360,783 B1 | | 3/2002 | Faverio, IV et al. | |
| 2004/0238057 A1 | * | 12/2004 | Crim | 138/149 |

* cited by examiner

*Primary Examiner*—James Hook
(74) *Attorney, Agent, or Firm*—RatnerPrestia

(57) ABSTRACT

This invention provides a duct cover system for ducts installed in exposed locations. For use primarily with ducts having generally rectangular cross sections, the duct cover system provides a roof over the duct that may be integral with the duct or retrofitted to the duct. The roof includes at least one cover panel extending along the duct length. The cover panel is inclined laterally relative to the duct bottom wall thereby to shed water and prevent snow accumulation.

20 Claims, 2 Drawing Sheets

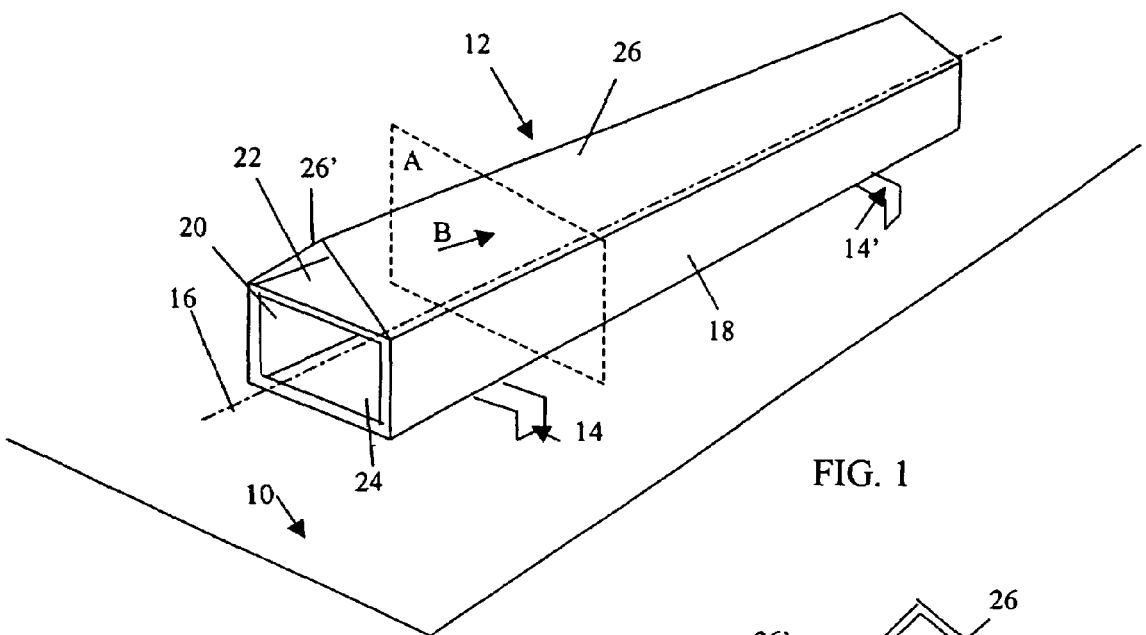
FIG. 1
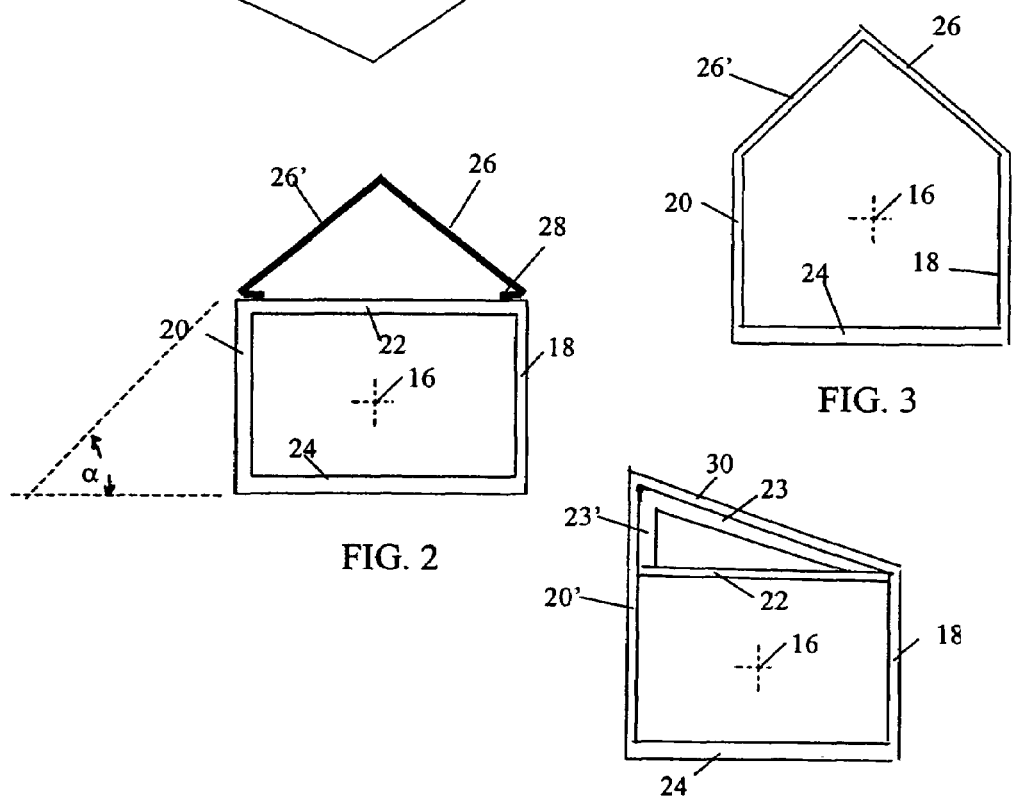
FIG. 2
FIG. 3
FIG. 4

EXTERIOR DUCTWORK SYSTEM

CROSS REFERENCE TO RELATED APPLICATIONS

This application claims the benefit of priority to U.S. Provisional Application No. 60/473,903, filed on May 28, 2003, the content of which is incorporated herein by reference in its entirety.

FIELD OF THE INVENTION

This invention relates to an exterior duct work design and more particularly to a ductwork design having an integral peaked roof for the protection of the plenum from the elements.

BACKGROUND OF THE INVENTION

Conventional central air conditioning and heating equipment comprises a blower which forces air through a heat exchanger and thereafter distributes the air through a system of air distribution ducts or plenums to various parts of a building. Similarly such systems include a return path also comprising ducts for returning air from within the building to the heat exchanger. Optionally the system of ducts may include ducts for introducing fresh air from outside the building into the system.

As such heating and air conditioning system have become larger to accommodate larger volumes in larger buildings, cross sections of the air circulating ducts have become progressively larger, and it has often become necessary to direct some of the larger ducts outside the building. With most industrial air conditioning and heating systems currently being located on the roof of buildings a substantial effort has been expended to reduce the heat transfer characteristics particularly of exposed duct work, as illustrated by numerous patents on duct insulation schemes, including U.S. Pat. Nos. 4,735,235 issued to Anderson et al. and U.S. Pat. No. 6,360,783 issued to Faviero, IV et al.

While insulating the ducts as taught by these patents provides substantial improvement in reducing the heat losses in such duct systems, particularly when such ducts are located within a building structure and therefore protected from the elements, ducts located on building roofs or other exposed areas present a host of additional problems due to their exposed nature, such as water or snow accumulation on their top surface. This problem is particularly vexing since the large ducts used on roof tops often have a square or rectangular cross section, such cross sections offering other unrelated advantages over circular cross section ducts. Such accumulation adversely effects the heat exchange characteristics, water being a better heat conductor than air, promotes oxidation, results in material degradation, and places excess weight on the duct system requiring extra supports. Providing a separate cover or placing the ducts in a protected area on the roof is most often not practical.

There is, therefore, still need for a duct design that alleviates some of the problems associated with exposed duct work, without requiring changes or additions to the installation area.

SUMMARY OF THE INVENTION

It is, therefore, an object of this invention to provide a duct cover system comprising at least one inclined panel extending longitudinally along a length of said duct and laterally inclined relative to a bottom wall of said duct.

In one embodiment of the invention there is provided an air circulation duct for external installation on a building. It is, therefore, an object of this invention to provide a duct cover system comprising at least one inclined panel extending longitudinally along a length of said duct and laterally inclined relative to a bottom wall of said duct.

In another embodiment of the invention there is provided an air circulation duct design for external installation on a building.

Such duct has an axis and comprises two side walls, a bottom wall extending between the side walls and a duct cover panel opposite the bottom wall also between the side walls. All walls and panels extend longitudinally substantially parallel to the axis and the cover panel is inclined laterally to form an acute angle relative to the bottom wall in a plane substantially perpendicular to the axis.

Such duct has an axis and comprises two side walls, a bottom wall extending between the side walls and a duct cover panel opposite the bottom wall also between the side walls. All walls and panels extend longitudinally substantially parallel to the axis and the cover panel is inclined laterally to form an acute angle relative to the bottom wall in a plane substantially perpendicular to the axis.

Still within the scope of this invention the above described duct further comprises a top wall located under the cover panel extending between the side walls also along the duct axis and being substantially parallel to the bottom wall, to provide a plenum having a rectangular cross section.

The cover panel may be inclined along a single direction or may form a substantially peaked roof having a first side forming a first acute angle relative to the bottom panel and a second side forming a second acute angle relative to the bottom panel.

BRIEF DESCRIPTION OF THE DRAWINGS

FIG. 1 shows a perspective view of a duct constructed in accordance with this invention.

FIG. 2 shows an elevation cross section taken in the plane A as shown in FIG. 1.

FIG. 3. shows an elevation cross section of an alternate embodiment of a duct constructed in accordance with this invention.

FIG. 4 shows yet another elevation cross section of an alternate embodiment of a duct constructed in accordance with this invention.

DETAILED DESCRIPTION OF THE INVENTION

Figure 5:
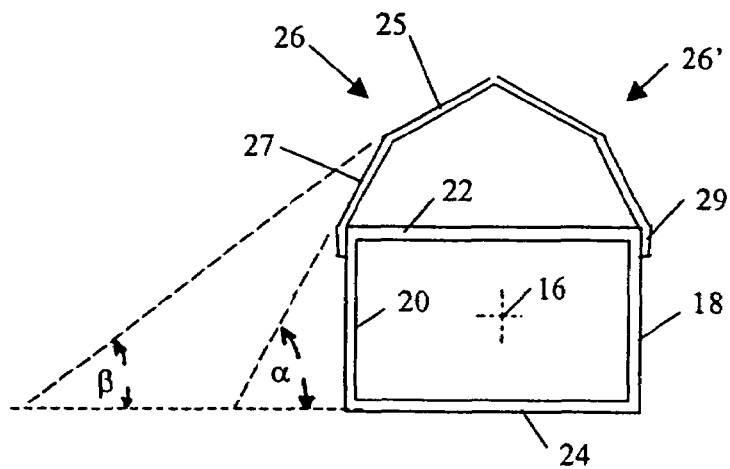
FIG. 5 shows yet another embodiment of this invention wherein the roof panels are inclined at more than one angle relative to the bottom wall of the duct.

Although the invention is illustrated and described herein with reference to specific embodiments, the invention is not intended to be limited to the details shown. Rather, various modifications may be made in the details within the scope and range of equivalents of the claims and without departing from the invention. Furthermore the figures are intended to illustrate this invention and do not represent actual engineering drawings of the duct construction nor are the dimensions to scale.

Referring next to FIG. 1 there is shown in three dimensional representation a typical duct plenum 12 according to this invention installed on a building roof 10. The duct 12 is supported on a support system 14 and 14' as is known in the art. The duct has a generally rectangular cross section, and extends along an axis 16 substantially perpendicular to the rectangular cross section. The duct is formed with opposing top and bottom walls 22 and 24 respectively and opposing side walls 18 and 20. Over top wall 22 there is shown a peaked roof structure providing two inclined cover panels 26 extending along the duct length and forming an acute angle α relative to the top wall 22 as better shown in FIG. 2.

FIG. 2 shows in schematic representation a cut away view of the duct 12 taken in the plane "A" shown in FIG. 1 along arrow "B". Plane "A" is a plane perpendicular to axis 16. As shown in FIG. 2, the peaked roof may include a rim 28 at one end of the cover panels which may be used for attaching the roof to an existing duct structure. In an alternate embodiment shown in FIG. 5, the cover panels may have side bands 29 extending partially along the duct side walls for attaching the peaked roof to the duct.

The attachment of the peaked roof to the duct may be accomplished with any one of well known fasteners including screws, rivets, glue etc. The duct may be manufactured with the roof attached or the roof may be designed to be attached after installation to a new or existing duct system.

In a alternate embodiment shown in FIG. 3, the duct has been constructed from the beginning with a cover panel forming a peaked roof and does not include the top wall 22. The merging of the top wall with the cover panel has the advantage of increasing the size of the duct cross section for a similar size duct having separate top walls and roof cover panels, such as the duct shown in FIG. 2.

FIG. 4 shows yet another embodiment of this invention, in which the peaked roof comprises a single inclined cover panel 30, and wherein one of the side walls, side wall 20' extends above the top wall 22 to connect with and form a support for the inclined cover panel. Insulation material 23 and 23' may be incorporated in the inner surface of the cover panels or be added to uninsulated panels prior to installation. Not illustrated but still within the scope of this invention is filling the space between the cover panels and the top wall of the duct with insulating material.

FIG. 5 is yet another embodiment of this invention in which the peaked roof is formed by panels having surfaces inclined at more than one acute angle relative to the bottom wall 24. As shown in this figure cover panels 26 each comprises a first portion 25 forming an angle β with the bottom wall and a second portion 27 forming a different angle α with the bottom wall. Such structures have the advantage of providing extra stiffness in the cover panel.

Preferably the cover panels are made of the same material as the duct. However this is not essential and the cover panels may be made of sheet metal or plastic or wood or any construction material that provides sufficient structural integrity to maintain its shape and resistance to exposure to the elements comparable to that of the duct itself.

Figure 8:
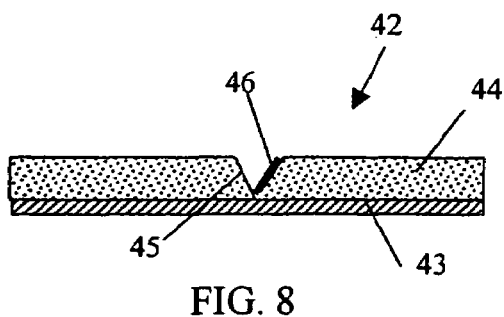
FIG. 8 shows a laminated structure for use in this invention.
Figure 9:
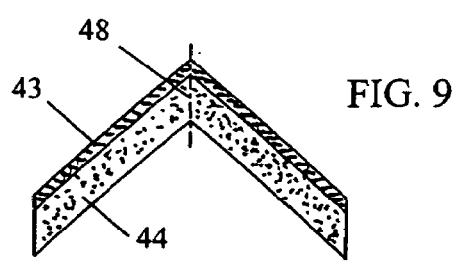
FIG. 9 shows a laminated peaked roof made using the laminated material shown in FIG. 8.

The cover panels are preferably made of laminated structures such as shown in FIGS. 8 and 9. Such panel structure provides additional rigidity as well as insulation to the cover panels requiring fewer or none supports along the length of the duct. As shown in FIG. 8, the panel may comprise a skin 43 such as aluminum, laminated onto an insulating substantially rigid material 44 such as a sheet of polyurethane. An alternative structure may comprise a sheet of melamine resin laminate panel, preferably high pressure laminates (HPL). The melamine sheets may be used by themselves or may in turn be laminated onto a protective exterior skin such as aluminum sheet. The aluminum skin may be incorporated during the melamine panel manufacturing or may be added to a melamine panel after the melamine panel formation. Melamine is desirable as it provides good structural strength coupled with lightness and good insulating properties in a single structure thus being a strong panel for use in a duct cover according to the present invention.

As shown in FIG. 8, a generally "V" shaped notch 45 is cut along the length of the laminated panel extending through the insulating material 44 but not through the skin 43. The skin may also be other than metal, such as Polyethylene Terephthalate sheeting, and need not necessarily be rigid when the laminated insulating material is sufficiently rigid by itself. The skin may be present on one of both sides of the laminated cover panel in which case the "V" notch is cut through one of the skins. An adhesive bead 46 is preferably placed on one or both sides of the groove 45 and the panel folded as shown in FIG. 9 to form a peaked roof shaped self supporting cover panel which exhibits substantial rigidity requiring few if any additional supports in use. When the insulating material is polyurethane the adhesive is preferably also a polyurethane adhesive.

Figure 6:
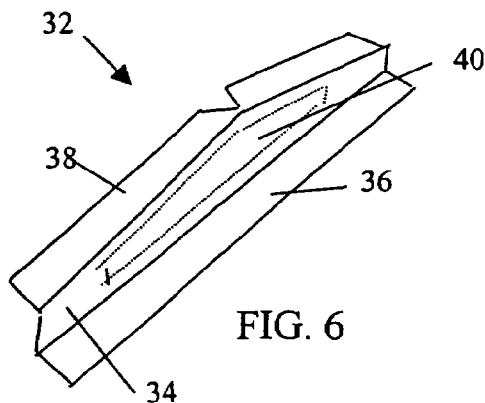
FIG. 6 shows in schematic representation a support for use in supporting the roof panels on the duct structure.
Figure 7:
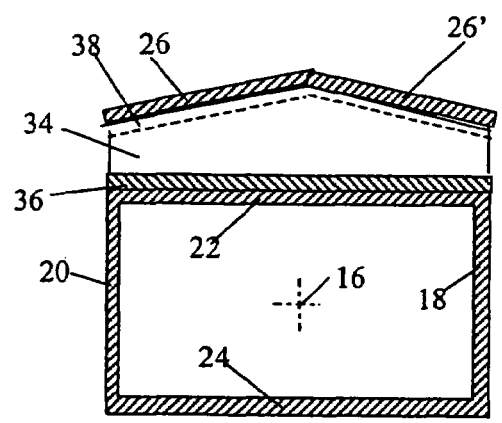
FIG. 7 shows an elevation cross section of a duct having a roof panel installed thereon supported by the support shown in FIG. 6.

In cases where the duct extends to a substantial length there is need for supporting structure to stiffen the inclined cover panels along the length of the duct. There is therefore contemplated in accordance with the present invention to provide structural support along the length of the duct such as shown in FIGS. 6 and 7. FIG. 6 shows a shaped support 32 for a two panel peaked roof structure comprising a base 36 sized to fit on top wall 22 and to be attached thereon. The support also includes an upright body portion 34 rising from the base in a generally vertical direction. Upright body portion 34 is shaped to provide inclined panel supports 38 and 38' angled a desired angle on which rest and are preferably fixedly attached roof panels 26. While the support illustrated in FIG. 5 is designed to support a peaked roof having two inclined panels 26 and 26', it is still within the scope of this invention to provide similar supports designed to fit and support peaked roof having a single inclined panel of the type shown in FIG. 4.

The support shown in FIG. 6 is also preferably used at the end of a length of duct to provide an enclosed space if so desired to provide better insulating properties in cases where it is desired to enclose the roof volume. In the alternative, support 32 may include openings 40 (shown in dotted line) to permit air flow in the space under the roof.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An air circulation duct for external installation on a building, said duct having an axis and comprising two side walls, a bottom wall and an integral peaked roof, extending between said side walls along said axis opposite said bottom wall adapted to prevent precipitation from accumulating on top of said duct, wherein said peaked roof comprises a cover section forming an acute angle relative to said bottom wall in a plane perpendicular to said axis.

2. The duct according to claim 1, further comprising a top wall located under said cover section, said top wall extending between said side walls also along said axis, said cover section preventing precipitation from accumulating on said top wall.

3. The duct according to claim 1 wherein said cover section comprises a first side forming a first acute angle relative to said bottom wall and a second side forming a second acute angle relative to said bottom wall.

4. The duct according to claim 1 wherein said cover section includes at least one side and said side includes at least two portions, each portion forming a different acute angle with said bottom wall.

5. The duct according to claim 1 wherein said cover section comprises sheet metal.

6. The duct according to claim 5 wherein said cover section further comprises an insulation layer on a surface thereof.

7. The duct according to claim 6 wherein said sheet metal is aluminum and said insulation layer is polyurethane.

8. The duct according to claim 1 wherein said cover section comprises melamine resin.

9. The duct according to claim 1 wherein said cover section comprises a melamine resin laminate comprising a metal outer skin.

10. The duct according to claim 1 wherein said cover section is constructed of the same material as the duct.

11. The duct cover according to claim 1 wherein said cover section is constructed of the same material as the duct.

12. A peaked roof, for attachment to a top wall of an air duct said air duct having a generally rectangular cross section and a bottom wall substantially parallel to said top wall, said duct also comprising two opposing side walls, the peaked roof adapted to prevent precipitation from accumulating on said duct top wall comprising at least one inclined cover section extending longitudinally along a length of said duct and laterally inclined relative to said bottom wall of said duct.

13. The duct cover system according to claim 12 adapted for retrofitting on an existing duct.

14. The duct cover system according to claim 13 wherein said inclined cover section is substantially peaked roof shaped having a first side forming a first acute angle relative to said bottom wall and a second side forming a second acute angle relative to said bottom wall.

15. The duct cover according to claim 12 wherein said cover section includes at least one side and said side includes at least two portions, each portion forming a different acute angle with said bottom wall.

16. The duct cover according to claim 12 wherein said cover section comprises sheet metal.

17. The duct cover according to claim 16 wherein said cover section further comprises an insulation layer on a surface thereof.

18. The duct cover according to claim 17 wherein said sheet metal is aluminum and said insulation layer is polyurethane.

19. The duct cover according to claim 12 wherein said cover section comprises melamine resin.

20. The duct cover according to claim 12 wherein said cover section comprises a melamine resin laminate comprising a metal outer skin.

* * * * *